No. 890,430. PATENTED JUNE 9, 1908.
J. MANN.
POISON DISTRIBUTER.
APPLICATION FILED MAR. 5, 1908.
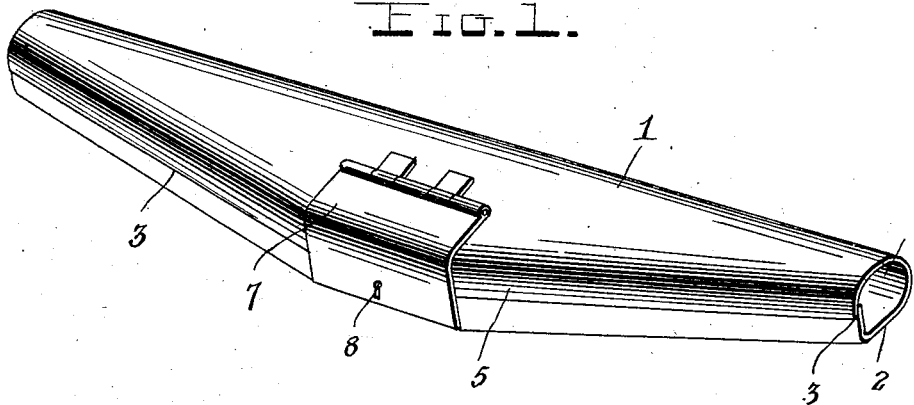
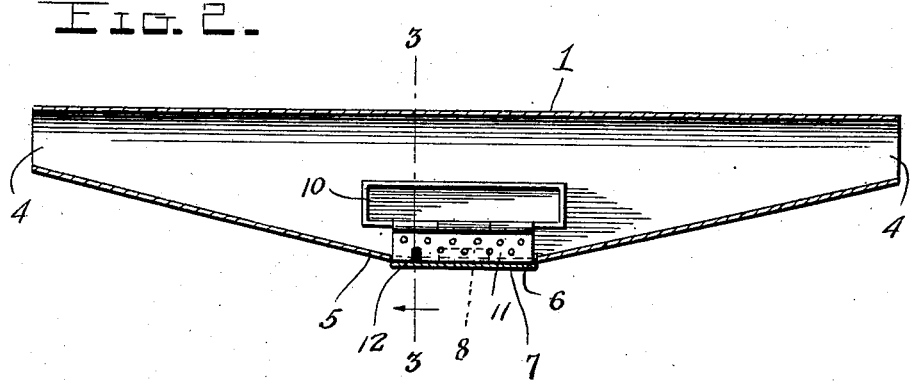
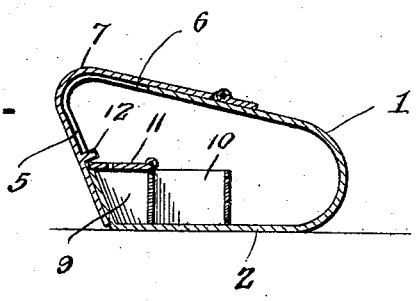
Witnesses
Chas. L. Griesbauer
C. H. Griesbauer
Inventor
John Mann
By H. B. Willson & Co.
Attorneys

UNITED STATES PATENT OFFICE.

JOHN MANN, OF GRIDLEY, CALIFORNIA.

POISON-DISTRIBUTER.

No. 890,430.  Specification of Letters Patent.  Patented June 9, 1908.

Application filed March 5, 1908. Serial No. 419,383.

*To all whom it may concern:*

Be it known that I, JOHN MANN, a citizen of the United States, residing at Gridley, in the county of Butte and State of California, have invented certain new and useful Improvements in Poison-Distributers; and I do declare the following to be a full, clear, and exact description of the invention, such as will enable others skilled in the art to which it appertains to make and use the same.

My invention relates to poison distributers and particularly to that class of device adapted to place poison in convenient localities where rats or mice may obtain access thereto.

The object of the invention is to provide a device of this character which may be placed around at convenient points in the yard or house, and which will be so constructed that while accessible for rats or mice it cannot be tampered with by children or entered by chickens, or other domestic fowls.

A further object of the invention is the provision of a decoy box in which a decoy may be placed closely adjacent to the poison box, but which will not be accessible.

With these and other objects in view, the invention consists of certain novel features of construction, combination and arrangement of parts, as will be more fully described and particularly pointed out in the appended claims.

In the drawings, Figure 1 is a perspective view, Fig. 2 is a top plan view with the upper edge of the casing removed, and Fig. 3 is a transverse section taken on line *x—x* of Fig. 2.

Referring more especially to the drawings, 1 represents the casing which is preferably flat upon its under side, as at 2 so as to provide a proper resting surface. The casing tapers from a point approximately midway to its ends and is lapped over as at 3, to form a tubular structure with apertures 4, being of sufficient diameter to permit the entrance of a rat or mouse. Formed at or about the center of the device upon the front side 5 is an aperture 6 sufficiently large to permit the insertion of a person's hand, which is covered by a door 7, adapted to be locked to the casing by a lock 8.

Located within the casing and extending across the opening 6 are a pair of boxes 9 and 10, the latter being somewhat larger than the former, and having its open top arranged approximately central with respect to the front and rear sides of the casing. The box 9 is provided with a perforated lid 11, which is hinged to the rear edge thereof so as to cover it and be locked in covered position by a lug 12 secured to the door 7.

The length of the box from end to end is considerably longer than twice the length of an abnormally long child's arm so that it is impossible for them to reach the poison box 10 in the center of the casing.

In practice the box 10 is filled with edible poison, such as bread with rough on rats incorporated therein, or any other similar poison compound and cheese or any other suitable decoy to place in the box 9, and the lid 11 closed and locked thereover by the cover lug on he cover 7.

It will be seen that while the apertures at the end are not sufficiently large to permit a chicken or other domestic fowl to obtain access to the poison box, a rat or mouse will have clear access thereto and will have an unobstructed view and passage through the entire device.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention what I claim as new and desire to secure by Letters-Patent is:

1. In a poison distributer for rats or mice, and the like, an elongated casing having an uninterrupted channel therethrough, a decoy bait box therein, and an open poison box adjacent thereto.

2. In a poison distributer for rats, mice and the like, an elongated casing, a decoy bait box therein, a lid therefor, a door for the casing, means carried by the door to lock the lid of said decoy bait box, and an open poison box arranged adjacent said decoy box.

3. In a poison distributer for rats, mice and the like, an open ended casing tapering from its center toward each end and being centrally apertured, a decoy bait box arranged adjacent the center, a lid therefor, a door for said casing arranged to close the aperture by which access is obtained to the interior of the casing, a lug on said door adapted to lock the lid of the decoy bait box, an open poison box arranged adjacent the decoy box, and a lock for the door.

In testimony whereof I have hereunto set my hand in presence of two subscribing witnesses.

JOHN MANN.

Witnesses:
   J. W. LONG,
   WM. TALLEY